US012664775B2

(12) United States Patent
Simonelli et al.

(10) Patent No.:     US 12,664,775 B2
(45) Date of Patent:          Jun. 23, 2026

(54) IMAGE ANALYSIS SYSTEMS AND METHODS FOR DETERMINING BUILDING ROOF AGE

(71) Applicant: Betterview Marketplace, Inc., San Francisco, CA (US)

(72) Inventors: Julius Simonelli, San Diego, CA (US); Ilsoo Seong, Aliso Viejo, CA (US); Jason Janofsky, San Marcos, CA (US); Nicholas Molyneux, San Diego, CA (US); David Tobias, San Francisco, CA (US); David Lyman, Houston, TX (US)

(73) Assignee: NEARMAP US, INC., Lehi, UT (US)

( * ) Notice: Subject to any disclaimer, the term of this patent is extended or adjusted under 35 U.S.C. 154(b) by 212 days.

(21) Appl. No.: 18/226,721

(22) Filed: Jul. 26, 2023

(65) Prior Publication Data

US 2025/0037454 A1     Jan. 30, 2025

(51) Int. Cl.
*G06V 20/10*          (2022.01)
*G06T 7/00*           (2017.01)
          (Continued)

(52) U.S. Cl.
CPC .......... G06V 20/176 (2022.01); G06T 7/0002 (2013.01); G06V 10/245 (2022.01);
          (Continued)

(58) Field of Classification Search
CPC ...... G06V 20/176; G06V 10/32; G06V 10/82; G06V 10/26; G06V 10/245; G06V 10/24;
          (Continued)

(56) References Cited

U.S. PATENT DOCUMENTS 9,152,863 B1 * 10/2015 Grant .................... G06Q 10/20
10,529,029 B2   1/2020 Okazaki
          (Continued)

OTHER PUBLICATIONS

Heinrich, C., Laskin, M., Glinskis, S., & van Nieuwenburg, E. (2020). Roof Age Determination for the Automated Site-Selection of Rooftop Solar. arXiv preprint arXiv:2001.04227 (Year: 2020).*
          (Continued)

*Primary Examiner* — Utpal D Shah
*Assistant Examiner* — Jack Peter Kraynak
(74) *Attorney, Agent, or Firm* — Ruggiero McAllister & McMahon LLC

(57)          ABSTRACT

Methods, non-transitory computer readable media, and roof analysis systems are disclosed that preprocess overhead images in imagery data obtained based on a request comprising a geographic location. The overhead images depict a building at different historical points in time identified in the imagery data. A neural network is applied to input data structures into which the overhead images are converted. The neural network is trained to extract relationships between features from the input data structures indicating changes in a roof of the building and generate an output data structure representing the changes. Patterns in the output data structure are analyzed to determine instances of change of the roof. A roof age is then output via a user interface in response to the request. The roof age is generated based on a likelihood of the instances of change or a time interval between the overhead images and a current time.

16 Claims, 7 Drawing Sheets

(51) Int. Cl.

| | |
|---|---|
| *G06V 10/24* | (2022.01) |
| *G06V 10/26* | (2022.01) |
| *G06V 10/32* | (2022.01) |
| *G06V 10/82* | (2022.01) |

(52) U.S. Cl.
CPC .............. *G06V 10/26* (2022.01); *G06V 10/32* (2022.01); *G06V 10/82* (2022.01); *G06T 2200/24* (2013.01); *G06T 2207/20081* (2013.01); *G06T 2207/20084* (2013.01); *G06T 2207/30184* (2013.01)

(58) Field of Classification Search
CPC ......... G06T 7/0002; G06T 2207/20081; G06T 2207/20084; G06T 2207/30184
See application file for complete search history.

(56) References Cited

U.S. PATENT DOCUMENTS

| | | | |
|---|---|---|---|
| 10,572,948 | B1 | 2/2020 | Cook et al. |
| 10,650,285 | B1 * | 5/2020 | Okazaki ................. G06N 20/20 |
| 10,949,930 | B1 | 3/2021 | Tofte et al. |
| 11,030,491 | B2 | 6/2021 | Okazaki |
| 11,151,378 | B2 | 10/2021 | Kottenstette et al. |
| 11,195,058 | B2 | 12/2021 | Okazaki |
| 11,347,976 | B2 | 5/2022 | Okazaki |
| 11,551,040 | B2 | 1/2023 | Okazaki |
| 11,682,197 | B2 * | 6/2023 | Porter .................... G06T 11/00 |
| | | | 382/195 |
| 11,687,768 | B2 | 6/2023 | Okazaki |
| 2014/0270492 | A1 * | 9/2014 | Christopulos .......... G06V 20/39 |
| | | | 382/159 |
| 2016/0373662 | A1 * | 12/2016 | Olsen .................... G06V 20/13 |
| 2019/0205287 | A1 | 7/2019 | Emison et al. |
| 2022/0130145 | A1 * | 4/2022 | Connary ............... G05D 1/101 |
| 2023/0011777 | A1 * | 1/2023 | Brown .................. G06V 10/82 |
| 2023/0230220 | A1 * | 7/2023 | Portail .................... G06T 7/70 |
| | | | 382/276 |
| 2024/0233343 | A1 * | 7/2024 | Mayster .............. G06V 10/764 |

OTHER PUBLICATIONS

Wang, Fan, "Understanding High Resolution Aerial Imagery Using Computer Vision Techniques." Chester F. Carloson Center for Imaging Science College of Science. Aug. 2017. https://home.cis.rit.edu/~cnspci/references/theses/phd/wang2017.pdf.

* cited by examiner

IMAGE ANALYSIS SYSTEMS AND METHODS FOR DETERMINING BUILDING ROOF AGE

FIELD

The disclosed technology generally relates to image analysis systems and methods for determining building roof age and, more particularly, to systems and methods that apply a neural network-based analysis to overhead imagery to estimate the age of a building's roof with increased reliability and accuracy.

BACKGROUND

Roof age is a critical factor in the insurance industry, as it directly influences the structural integrity, safety, and value of a building. Accurate estimation of roof age is essential for insurers to assess risk, calculate premiums and replacement costs, and plan for potential claims. Despite its importance, reliable methods for determining roof age have been lacking. Traditional methods for estimating roof age rely on building permit data, property records, and homeowner estimates. However, these methods suffer from several shortcomings that compromise their accuracy and reliability.

Specifically, building permit data can be incomplete or outdated, as permits may not always reflect the actual construction or renovation timeline. Additionally, not all roofing work requires a permit, so relying on this information can result in an inaccurate assessment of the roof's age. Property records can also be unreliable, as they may not be regularly updated to account for changes in the roof's condition or material. Furthermore, property records typically focus on the age of the entire building, rather than the roof specifically, so they may not provide an accurate reflection of the roof's current state. Homeowner estimates are unreliable for a variety of reasons. Homeowners may not have access to complete information about their roof's history, especially if the roof was replaced or repaired prior to their ownership. Homeowners also face incentives to underestimate the age of a roof.

With the increased availability of overhead imagery, technical solutions for estimating roof age have been developed that improve scalability and are automated, non-invasive, and relatively cost-effective. However, current overhead image analysis methods have limited accuracy and reliability, are unable to effectively distinguish and evaluate particular buildings, building sections, and/or roof sections, and are inefficient with respect to effectively processing large volumes of imagery data. Specifically, current image processing systems do not efficiently manage computationally intensive, complex analyses of historical images to yield accurate and reliable roof age estimation.

SUMMARY

Described herein are systems and methods for applying a neural network-based analysis to overhead imagery to estimate the age of a building's roof with increased reliability and accuracy. The disclosed technology addresses the need for a more reliable and accurate method to estimate the age of a building's roof by providing methods and systems that leverage neural network-based analysis of overhead imagery to derive a more precise and objective estimation of roof age.

In one embodiment, the present disclosure is directed to a method that is implemented by a roof analysis system and includes preprocessing overhead images in imagery data obtained from an overhead imagery server based on a roof age request comprising a geographic location received from a user device. Each of the overhead images depicts a building at a different historical point in time identified in the imagery data. A neural network is applied to one or more input data structures into which the overhead images are converted. The neural network is trained to extract relationships between features from the input data structures indicating one or more changes in a roof of the building and generate at least one output data structure representing the changes. One or more patterns in the output data structure are analyzed to determine one or more likely instances of change of the roof. An estimated roof age for the roof is output via a user interface provided to the user device in response to the roof age request. The estimated roof age is generated based on one or more of a likelihood of each of the likely instances of change or a time interval between one or more of the overhead images and a current time.

In some examples, the overhead images are aligned based on one or more of a footprint of the building or a property boundary associated with the geographic location to preprocess the overhead images. The overhead images are also cropped to a dilated and expanded representation of the footprint or the property boundary to preprocess the overhead images in some examples. In other examples, the overhead images are normalized, resized, or resampled to preprocess the overhead images. In yet other examples, the overhead images are enhanced to preprocess the overhead images by applying one or more of an edge detection, a sharpening, a color space transformation, a histogram equalization, or a noise reduction technique.

The input data structures comprise one or more tensors or one or more multi-dimensional arrays in some examples in which pixel values of the overhead images are normalized within a range prior to converting the overhead images into the input data structures. In other examples, the geographic location comprises an address or geographic coordinates, the building comprises a building entirety or a building section, and the likely instances of change correspond to an entirety of the roof or one or more portions or sections of the roof. One or more of a statistical, heuristic, or machine learning technique is applied to the output data structure to determine the likely instances of change of the roof in some examples. Feedback data is received in response to the estimated roof age and the neural network is retrained based on the feedback data in other examples of the disclosed technology.

The estimated roof age is determined based on a first historical point in time identified and correlated in the imagery data with a first one of the overhead images corresponding to one of the likely instances of change in some examples. In these examples, the user interface is generated to include the first one of the overhead images and a second one of the overhead images identified and correlated in the imagery data with a second historical point in time that is prior to the first historical point in time to thereby represent the roof before and after the one of the likely instances of change. The time interval is determined in some examples based on the different historical points in time identified in the imagery data.

In other embodiments, a roof analysis system is disclosed that includes memory having instructions stored thereon and one or more processors coupled to the memory and configured to execute the stored instructions to preprocess overhead images in imagery data obtained from an overhead imagery server based on a roof age request comprising a geographic location received from a user device. Each of the overhead images depicts a building at a different historical point in time identified in the imagery data. A neural network is then applied to the overhead images. The neural network is trained to extract relationships between features from the overhead images indicating one or more changes in a roof of the building and generate at least one output data structure representing the changes. One or more patterns in the output data structure are analyzed to determine one or more likely instances of change of the roof. An estimated roof age for the roof is output via a user interface provided to the user device in response to the roof age request. The estimated roof age is generated based on a time interval between one or more of the overhead images and a current time.

In some examples, the processors are further configured to execute the stored instructions to align the overhead images based on one or more of a footprint of the building or a property boundary associated with the geographic location to preprocess the overhead images. In other examples, the building comprises a building entirety or a building section, and the likely instances of change correspond to an entirety of the roof or one or more portions or sections of the roof.

In yet other examples, the processors are further configured to execute the stored instructions to normalize pixel values of the overhead images within a range. The overhead images are then converted into one or more input data structures. The neural network is applied to the input data structures, wherein the input data structures comprise one or more tensors or one or more multi-dimensional arrays.

In some examples, the processors are further configured to execute the stored instructions to determine the estimated roof age based on a first historical point in time identified and correlated in the imagery data with a first one of the overhead images corresponding to one of the likely instances of change. In these examples, the user interface is generated to include the first one of the overhead images and a second one of the overhead images identified and correlated in the imagery data with a second historical point in time that is prior to the first historical point in time to thereby represent the roof before and after the one of the likely instances of change.

In yet another embodiment, a non-transitory computer readable medium is disclosed that has stored thereon instructions comprising executable code that, when executed by one or more processors, causes the processors to preprocess overhead images in imagery data obtained from an overhead imagery server based on a roof age request comprising a geographic location received from a user device. Each of the overhead images depicts a building at a different historical point in time. Additionally, the preprocessing comprises at least aligning the overhead images based on one or more of a footprint of the building or a property boundary associated with the geographic location. A neural network is applied to the overhead images. The neural network is trained to extract relationships between features from the overhead images indicating one or more changes in a roof of the building and generate at least one output representing the changes. One or more patterns in the output are analyzed to determine one or more likely instances of change of the roof. An estimated roof age for the roof is then output via a user interface provided to the user device in response to the roof age request. The estimated roof age is generated based on a time interval between one or more of the overhead images and a current time.

In some examples, the executable code, when executed by the processors, further causes the processors to convert the overhead images into one or more input data structures. In these examples, the neural network is applied to the input data structures, wherein the input data structures comprise one or more tensors or one or more multi-dimensional arrays. In yet other examples, the executable code, when executed by the processors, further causes the processors to determine the estimated roof age based on a first historical point in time identified and correlated in the imagery data with a first one of the overhead images corresponding to one of the likely instances of change. In these examples, the user interface is generated to include the first one of the overhead images and a second one of the overhead images identified and correlated in the imagery data with a second historical point in time that is prior to the first historical point in time.

BRIEF DESCRIPTION OF THE DRAWINGS

The accompanying drawings, which are incorporated in and form a part of the specification, illustrate the embodiments of the invention and together with the written description serve to explain the principles, characteristics, and features of the invention. In the drawings.

DETAILED DESCRIPTION

This disclosure is not limited to the particular systems, devices and methods described, as these may vary. The terminology used in the description is for the purpose of describing the particular versions or embodiments only and is not intended to limit the scope.

Figure 1:
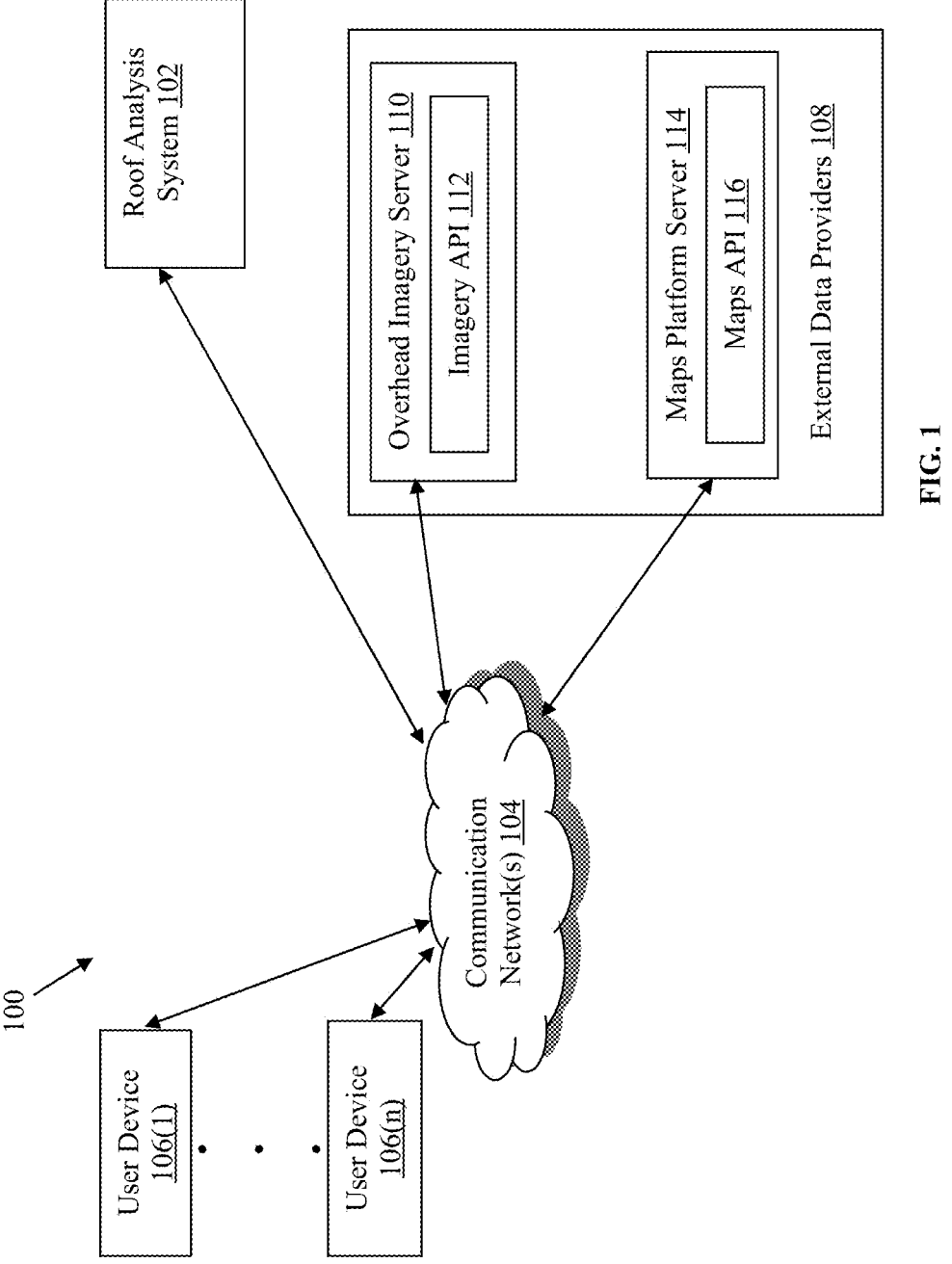
FIG. 1 is a block diagram of an exemplary network environment with a roof analysis system.

Referring to FIG. 1, an exemplary network environment 100 is illustrated that includes a roof analysis system 102, which is coupled via communication network(s) 104 to user devices 106(1)-106(n) and external data providers 108, which in this example include an overhead imagery server 110 hosting an imagery API 112 and a maps platform server 114 hosting a maps API 116, although other external data providers can also be included in the network environment in other examples. The network environment 100 may include other network devices such as one or more routers or switches, for example, which are known in the art and thus will not be described herein.

In this example, the roof analysis server 102, user devices 106(1)-106(n), overhead imagery server 110, and maps platform server 114, are disclosed in FIG. 1 as dedicated hardware devices. However, one or more of the roof analysis system 102, user devices 106(1)-106(n), overhead imagery server 110, or maps platform server 114 can also be implemented in software within one or more other devices in the network environment 100. As one example, the roof analysis system 102, as well as any of its components or applications, can be implemented as software executing on the overhead imagery server 110, and many other permutations and types of implementations and network topologies can also be used in other examples.

Figure 2:
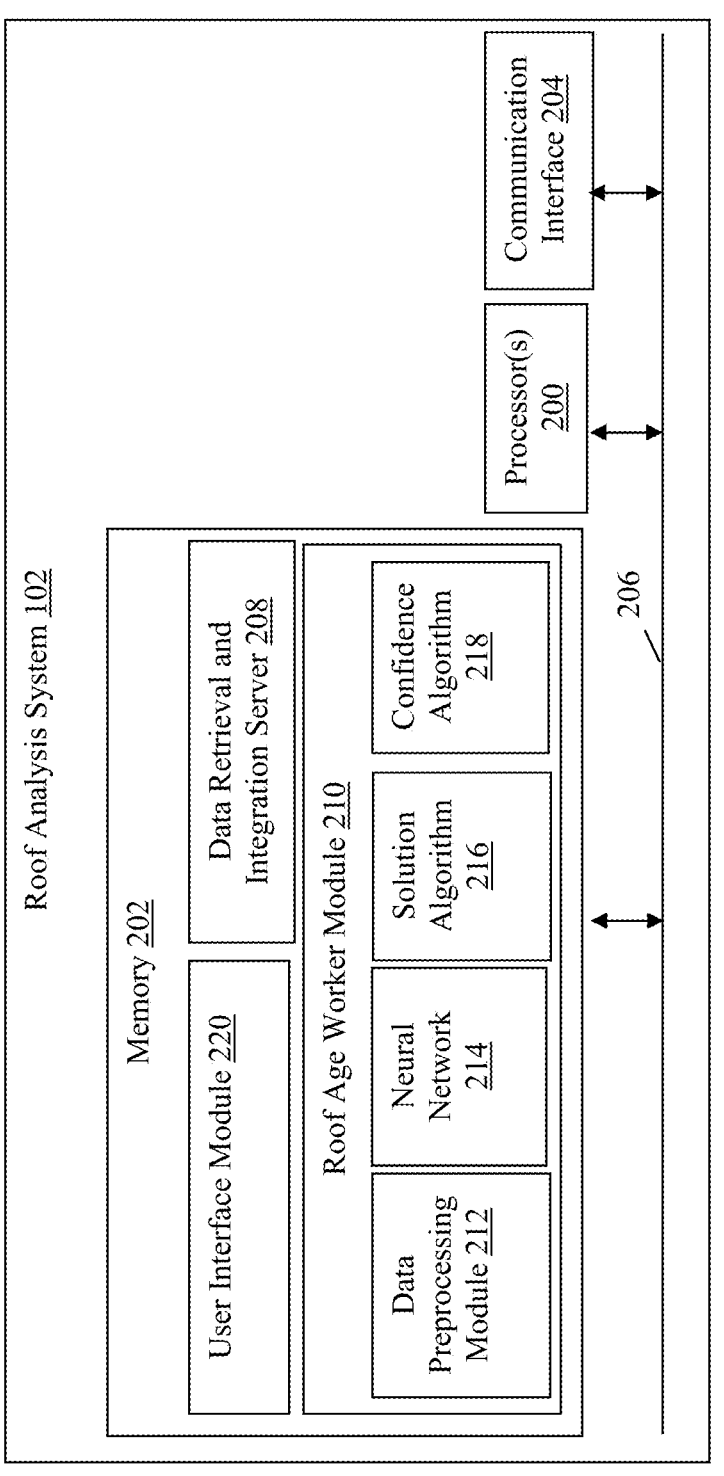
FIG. 2 is a block diagram of an exemplary roof analysis system.

Referring to FIGS. 1-2, the roof analysis system 102 may perform any number of functions, including image analysis, image preprocessing, applying machine learning models, and providing GUIs to the user devices 106(1)-106(n), among other functions as described in detail below. The roof analysis system 102 in this example includes processor(s) 200, memory 202, and a communication interface 204, which are coupled together by a bus 206, although the roof analysis system 102 can include other types or numbers of elements in other configurations.

The processor(s) 200 of the roof analysis system 102 may execute programmed instructions stored in the memory 202 of the roof analysis system 102 for any number of the functions described herein. The processor(s) 200 may include one or more processing cores, one or more central processing units, and/or one or more graphics processing units, for example, although other types of processor(s) can also be used.

The memory 202 stores these programmed instructions for one or more aspects of the present technology as described herein, although some or all of the programmed instructions could be stored elsewhere. A variety of different types of memory storage devices, such as random-access memory (RAM), read only memory (ROM), hard disk, solid state drives, flash memory, or other computer readable medium which is read from and written to by a magnetic, optical, or other reading and writing system that is coupled to the processor(s) 200, can be used for the memory 202.

Accordingly, the memory 202 can store applications that can include computer executable instructions that, when executed by the processor(s) 200, cause the roof analysis system 102 to perform actions, such as to transmit, receive, or otherwise process network messages and requests and generate graphical interfaces and displays, for example, and to perform other actions described herein. The application(s) can be implemented as components of other applications, operating system extensions, and/or plugins, for example.

Further, the application(s) may be operative in a cloud-based computing environment with access provided via a software-as-a-service (SaaS) model. The application(s) can be executed within or as virtual machine(s) or virtual server(s) that may be managed in a cloud-based computing environment. Also, the application(s), and even the roof analysis system 102 itself, may be located in virtual server(s) running in a cloud-based computing environment rather than being tied to specific physical network computing devices.

In some examples, the memory 202 includes a data retrieval and integration server 208, a roof age worker module 210 with a data preprocessing module 212, a neural network 214, a solution algorithm 216, and a confidence algorithm 218, and a user interface module 220, although other modules can also be used in other examples. The data retrieval and integration server 208 is configured to obtain imagery data including overhead images and corresponding temporal information from the overhead imagery server 110 via the imagery API 112. The operation of the data retrieval and integration server 208 will be described in more detail below with reference to FIG. 4.

The roof age worker module 210 generally obtains the overhead images data structures corresponding thereto, preprocesses the images to improve image quality, reduce subsequent analysis complexity, and/or improve accuracy via realignment, for example, applies a neural network to input data structures converted from the overhead images, and analyzes patterns in an output of the neural network to identify likely instances of change of a building's roof. Thus, the data preprocessing module 212, which can be a part of or separate from the roof age worker module 210, performs any number of preprocessing functions such as resizing, normalizing color channels to account for differences in lighting conditions or image acquisition systems, or any other computer vision preprocessing techniques. In some examples, the processor(s) 200 include at least one graphics processing unit (GPU) on which the roof age worker module 210 can be executed for improved performance.

The roof age worker module 210 can employ the neural network 214 to analyze groups of the preprocessed overhead images to determine when changes in roofs depicted therein occurred. In some examples, the neural network 214 does not rely on a single factor but instead uses complex patterns to identify changes in a roof of a building. Accordingly, the neural network 214 can identify changes in a building roof across the historical overhead images and provide the changes (e.g., via an output data structure) to the solution algorithm 216. While a neural network is used in the examples described herein, any other type of machine learning or artificial intelligence model can also be used in other examples.

The solution algorithm 216, which also can be a part of or separate from the roof age worker module 210, is configured to determine the likely instances when the roof changed. The solution algorithm 216 in some examples can detect varying levels of change, including full, partial, or section-by-section changes to the roof. Thus, the solution algorithm 216 determines the likely instances of change by analyzing patterns in the neural network 214 output and considering various levels of change, such as full, partial, or section-by-section changes.

With the likely instance of change identified, the roof age worker module 210 then calculates an estimated age for the building roof based on the temporal data in the imagery data, and specifically the date corresponding to the overhead image associated with the most likely one of the instances of change and a current date. Optionally, the confidence module 218 can analyze the output of the solution algorithm 216 to generate a confidence score associated with the estimated roof age. In other examples, the confidence algorithm 218 can be used to analyze the likely instances of change identified by the neural network 214 to assign a likelihood to those likely instances of change to facilitate identification of the most likely one of the likely instances of change. The operation of the roof age worker module 210 will be described in more detail below with reference to FIG. 5.

The user interface module 220 is configured to both obtain from the user devices 106(1)-106(n) the input geographical information as well as generate interactive GUIs that include the estimated roof age generated by the roof age worker module 210 along with the overhead images that reflect the estimated roof age. The operation of the user interface module 220 will be described in more detail below with reference to FIGS. 6-7.

The communication interface 204 of the roof analysis system 102 operatively couples and communicates between the roof analysis system 102, user devices 106(1)-106(n), overhead imagery server 110, and maps platform server 114, which are coupled together at least in part by the communication network(s) 104 in this particular example, although other types or numbers of communication networks or systems with other types or numbers of connections or configurations to other devices or elements can also be used. The communication network(s) 104 can include wide area network(s) (WAN(s)) and/or local area network(s) (LAN(s)), for example, and can use TCP/IP over Ethernet and industry-standard protocols, although other types or numbers of protocols or communication networks can be used. The communication network(s) 104 can employ any suitable interface mechanisms and network communication technologies including, for example, Ethernet-based Packet Data Networks (PDNs).

The roof analysis system 102 in some examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory 202, communication interface 204, or other hardware or software components of one or more other devices included in the roof analysis system 102. Additionally, one or more of the devices that together comprise the roof analysis system 102 in other examples can be standalone devices or integrated with one or more other devices or apparatuses.

The overhead imagery server 110 can include processor(s), memory, and a communication interface, which are coupled together by a bus or other communication link (not illustrated), although other numbers or types of components could also be used. The overhead imagery server 110 can store a database or other data structure that includes overhead images correlated with temporal data associated with the capture or acquisition of the overhead images. The overhead images can be images captured by a drone, aircraft, satellite, high-altitude balloon, or any other source of overhead or aerial images (commonly referred to herein as "overhead images") and the overhead imagery server 110 can publish an imagery API 112 to facilitate access to the stored imagery data. Accordingly, the overhead imagery server 110 can provide an API endpoint, for example, configured to intake prospective requests with particular criteria from the roof analysis system 102 and return imagery data including an indication of available imagery dates, overhead images, and corresponding temporal data.

The maps platform server 114 also can include processor(s), memory, and a communication interface, which are coupled together by a bus or other communication link (not illustrated), although other numbers or types of components could also be used. The maps platform server 114 can host databases and modules configured to resolve geographic information included in roof age requests to particular properties and associated precise parcel locations in order to filter the imagery data based on the particular roof age request from one of the user devices 106(1)-106(n). Accordingly, the maps platform server 114 can provide the maps API 116 configured to intake geographic information and return a precise property location to facilitate generation of a bounding box within obtained overhead images. Each of the overhead imagery server 110 and maps platform server 114 can facilitate other functionality in other examples, and other external data providers 108 can also be provided in the network environment 100.

Each of the user devices 106(1)-106(n) of the network environment 100 in this example includes any type of computing device that can exchange network data, such as mobile, desktop, laptop, or tablet computing devices. Each of the user devices 106(1)-106(n) includes processor(s), memory, and a communication interface, which are coupled together by a bus or other communication link (not illustrated), although other numbers or types of components could also be used. Each of the user devices 106(1)-106(n) may run interface applications, such as web browsers or standalone applications, which may provide an interface to communicate with the roof analysis system 102 via the communication network(s) 104. Each of the user devices 106(1)-106(n) may further include a display device, such as a display screen or touchscreen, or an input device, such as a keyboard or mouse, for example (not shown).

Although the exemplary network environment 100 with the roof analysis system 102, user devices 106(1)-110(n), overhead imagery server 110, maps platform server 114, and communication network(s) 104 is described herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 100, such as the roof analysis system 102, user devices 106(1)-110(n), overhead imagery server 110, or maps platform server 114, for example, may be configured to operate as virtual instances on the same physical machine. In other words, one or more of the roof analysis system 102, user devices 106(1)-110(n), overhead imagery server 110, or maps platform server 114 may operate on the same physical device rather than as separate devices communicating through the communication network(s) 108. Additionally, there may be more or fewer roof analysis systems, user devices, overhead imagery servers, or maps platform servers than illustrated in FIG. 1.

The examples of this technology may also be embodied as one or more non-transitory computer readable media having instructions stored thereon, such as in the memory 202 of the roof analysis system 102, for one or more aspects of the present technology, as described and illustrated by way of the examples herein. The instructions in some examples include executable code that, when executed by one or more processors, such as the processor(s) 200 of the roof analysis system 102, cause the processors to carry out steps necessary to implement the methods of the examples of this technology that will now be described herein.

Figure 3:
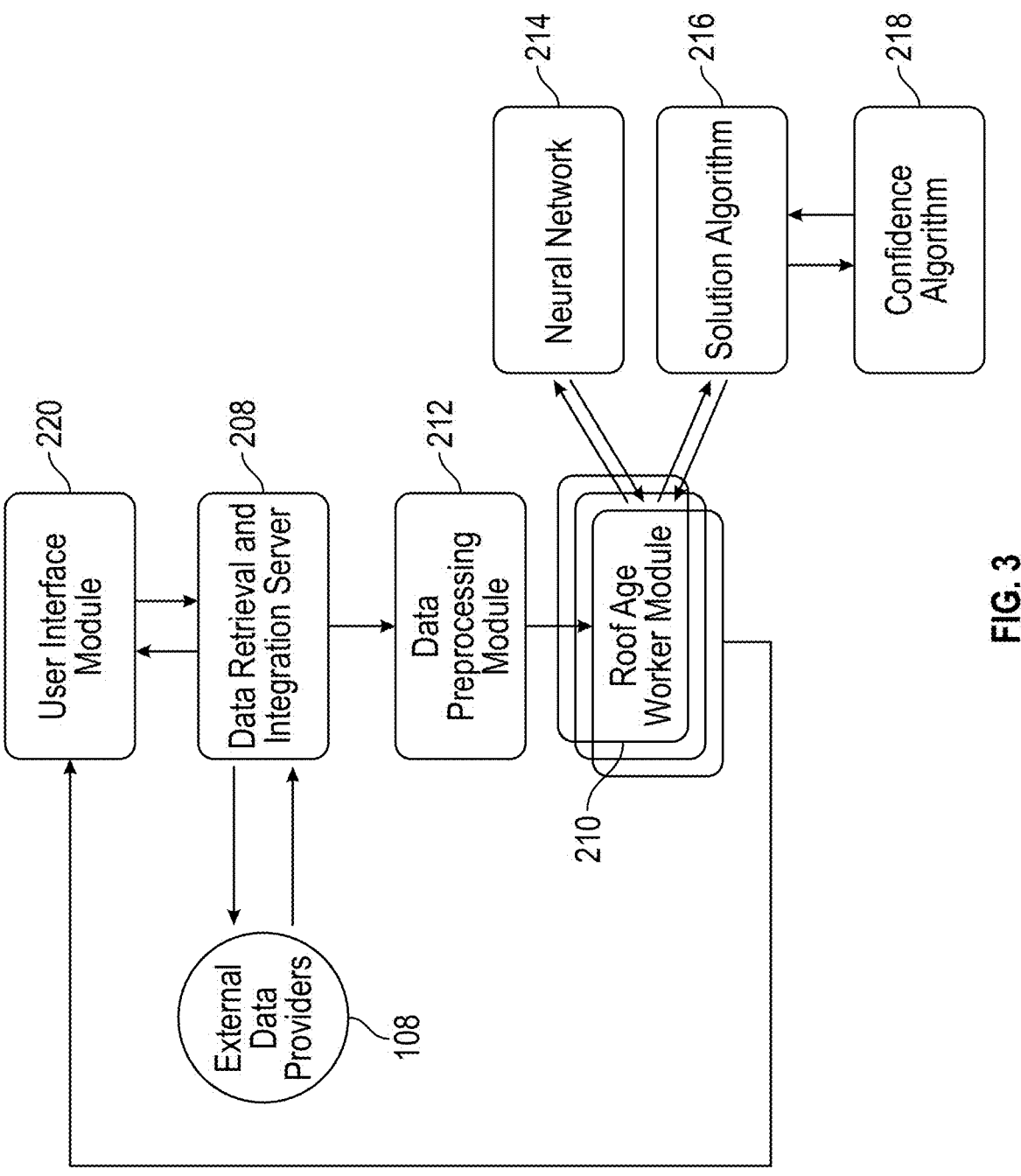
FIG. 3 is a flow diagram of an exemplary method for determining an estimated building roof age.

Referring now to FIG. 3, a flow diagram of an exemplary method for determining an estimated building roof age is illustrated. In this example, the user interface module 220 provides a GUI to one of the user devices 106(1)-106(n) that is configured to receive a roof age request including geographic information relating to a building of interest with respect to the age of the building's roof. The data retrieval and integration server 208 then interfaces with the external data providers 108 to resolve the geographic information to a precise property location and obtain imagery data, including historical overhead images and corresponding temporal data, associated with the property location.

In this example, the data preprocessing module 212 then preprocesses the obtained overhead images to enhance, normalize, crop, and/or align the overhead images, for example, as described in more detail below with reference to step 500 of FIG. 5. The preprocessed overhead images are then optionally encoded and provided to the roof age worker module 210. The roof age worker module 210 optionally decodes the message(s) from the data preprocessing module 212, optionally further preprocesses the overhead images, and applies the neural network 214 to the overhead images to identify changes across the overhead images.

The solution algorithm 216 then analyzes the output of the neural network 214 representing those changes and determines the likely instances of change of the building's roof from among the identified changes. The confidence algorithm 218 then selects the most likely one of those likely instances of change that reflects the most recent change in the building's roof. The roof age worker module 210 then generates the estimated building roof age based on the temporal data corresponding to the overhead image(s) associated with the most likely one of the likely instances of change.

The user interface module 220 then generates an interactive GUI that includes the estimated roof age, and optionally one or more of the overhead images depicting the estimated roof age (e.g., prior and subsequent to the most likely one of the likely instances of change) and provides the interactive GUI to the one of the user devices 106(1)-106(n) in response to the roof age request. The operation of the roof analysis system 102 with respect to the flow diagram illustrated in FIG. 4 will now be described in more detail with reference to FIGS. 4-7.

Figure 4:
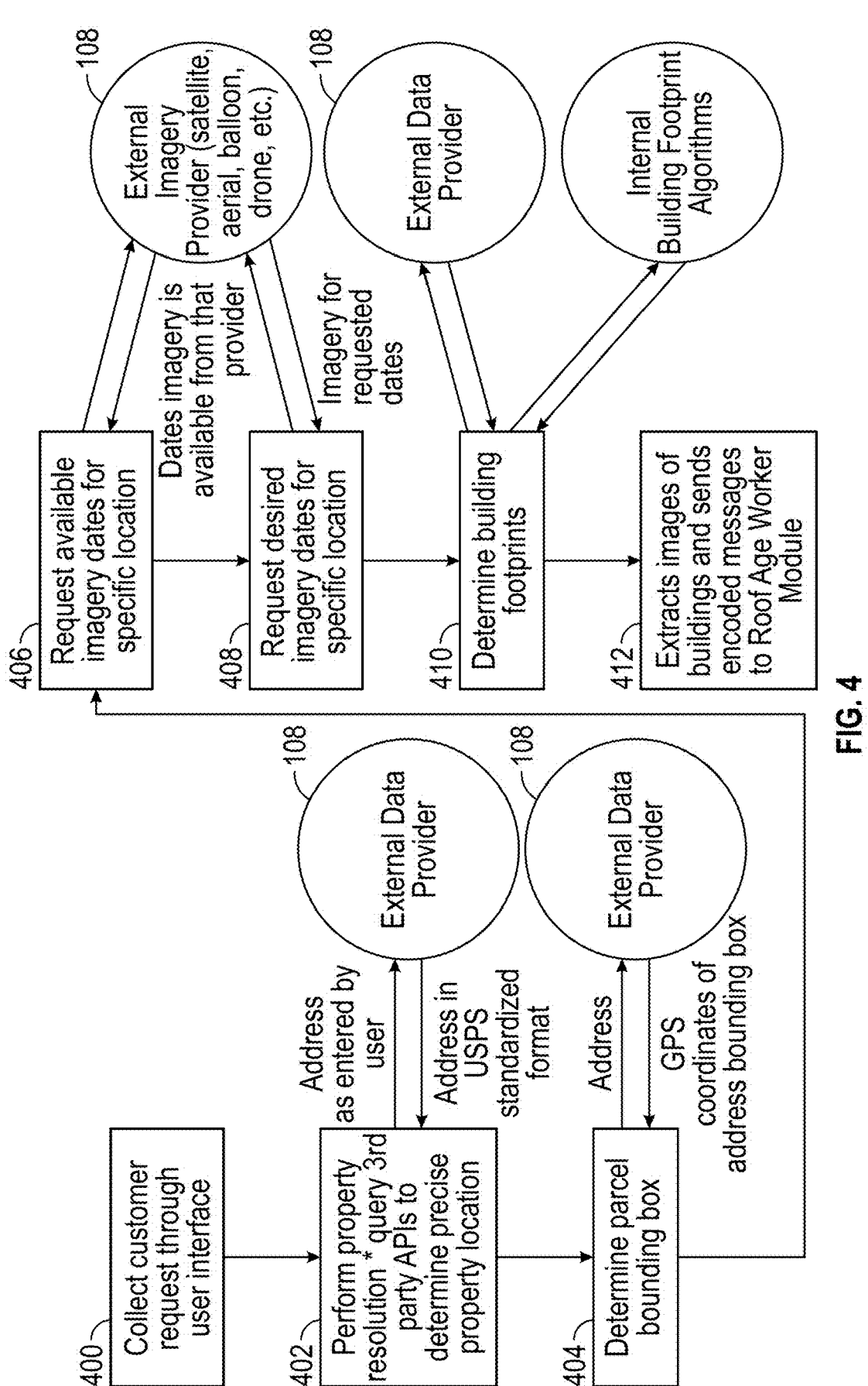
FIG. 4 is a flowchart of an exemplary method for analyzing obtained overhead images to identify buildings.

Referring more specifically to FIG. 4, a flowchart of an exemplary method for analyzing obtained overhead images to identify buildings is illustrated. In step 400 in this example, the roof analysis system 102 receives a roof age request from one of the user devices 106(1)-106(n) via a GUI provided to the one of the user devices 106(1)-106(n) by the roof analysis system 102. The roof age request can include a geographic location such as an address or geographic coordinates (e.g., latitude and longitude), for example, associated with a property of interest. Optionally, the roof analysis system 102 validates the input geographic location to ensure it is in a correct format and/or within an expected range for valid properties, for example.

In step 402, the roof analysis system 102 performs a property resolution to determine a precise property location or parcel for the property of interest. To resolve the property in some examples, the roof analysis system 102 interfaces with an external data provider 108 such as the maps platform server 114 to identify the correct property based on the input geographic location. For example, the roof analysis system 102 can match the input geographic location against an address database (e.g., to obtain a U.S. Postal Service standardized formal address) or communicate with the maps platform server 114 via the maps API 116 to perform a reverse geocoding of geographic coordinates to obtain an address when the address is not provided by the input geographic location, and other property resolution techniques can also be used in other examples.

In step 404, the roof analysis system 102 determines a parcel bounding box for the parcel corresponding to the property of interest. In some examples, the roof analysis system 102 retrieves the parcel boundary from one of the external data providers 108, such as the overhead imagery server 110 or another property database or Geographic Information System (GIS) system, for example.

In step 406, the roof analysis system 102 requests available imagery dates for the property of interest based on the parcel bounding box or other boundary information determined in step 404. In this example, the roof analysis system 102 can interface with any number of external data providers 108 capable of providing imagery data, including overhead images, to determine temporal information regarding the available imagery. The roof analysis system 102 can thereby determine whether any external data source 108 of imagery data is better (e.g., more comprehensive) or whether imagery data from multiple external data sources 108 may be required or may facilitate a more accurate analysis, for example.

In step 408, the roof analysis system 102 requests imagery data for the property of interest based on the bounding box or other property or building boundary information determined in step 404 and from one or more of the external data providers 108 queried in step 406 for availability. The imagery data includes historical overhead digital images and corresponding temporal data (e.g., month, date, and/or year) associated with the capture of each of the overhead images. Each of the overhead images depicts at least one building within the property of interest at a different historical point in time identified in the imagery data.

Accordingly, the roof analysis system 102 obtains imagery data from at least one overhead imagery server 110 via at least one imagery API 112 or other data exchange protocol. The overhead imagery server can return the relevant overhead images in any digital format, such as GeoTIFF, JPEG, and/or PNG, for example.

In step 410, the roof analysis system 102 determines a footprint for at least one building depicted in the obtained overhead images and associated with the property of interest. In some examples, the roof analysis system 102 determines the footprint for the building from a model that analyzes the overhead imagery, a third party associated with an external data provider 108 (e.g., the overhead imagery server 110, another property database, or a GIS system), a combination of a model and a third party, or via another method or source in other examples (e.g., an internal building footprint algorithm configured to analyze one or more of the overhead images to determine building boundaries and associated footprint). While a building is used in the example described and illustrated herein, the term building refers to a building entirety or a building portion or section.

In step 412, the roof analysis system 102 extracts images of the building for which the footprint was determined in step 410 from the obtained overhead images, and optionally sends encoded messages to the roof age worker module 210. Thus, the roof analysis system 102 can extract the relevant portions of the overhead images corresponding to the determined building footprint. The extracted overhead images can then be encoded (e.g., as a serialized binary format or JSON format) to the roof age worker module 210 (e.g., from the data retrieval and integration server 208) via a message queue or any other inter-process communication mechanism, for example.

Figure 5:
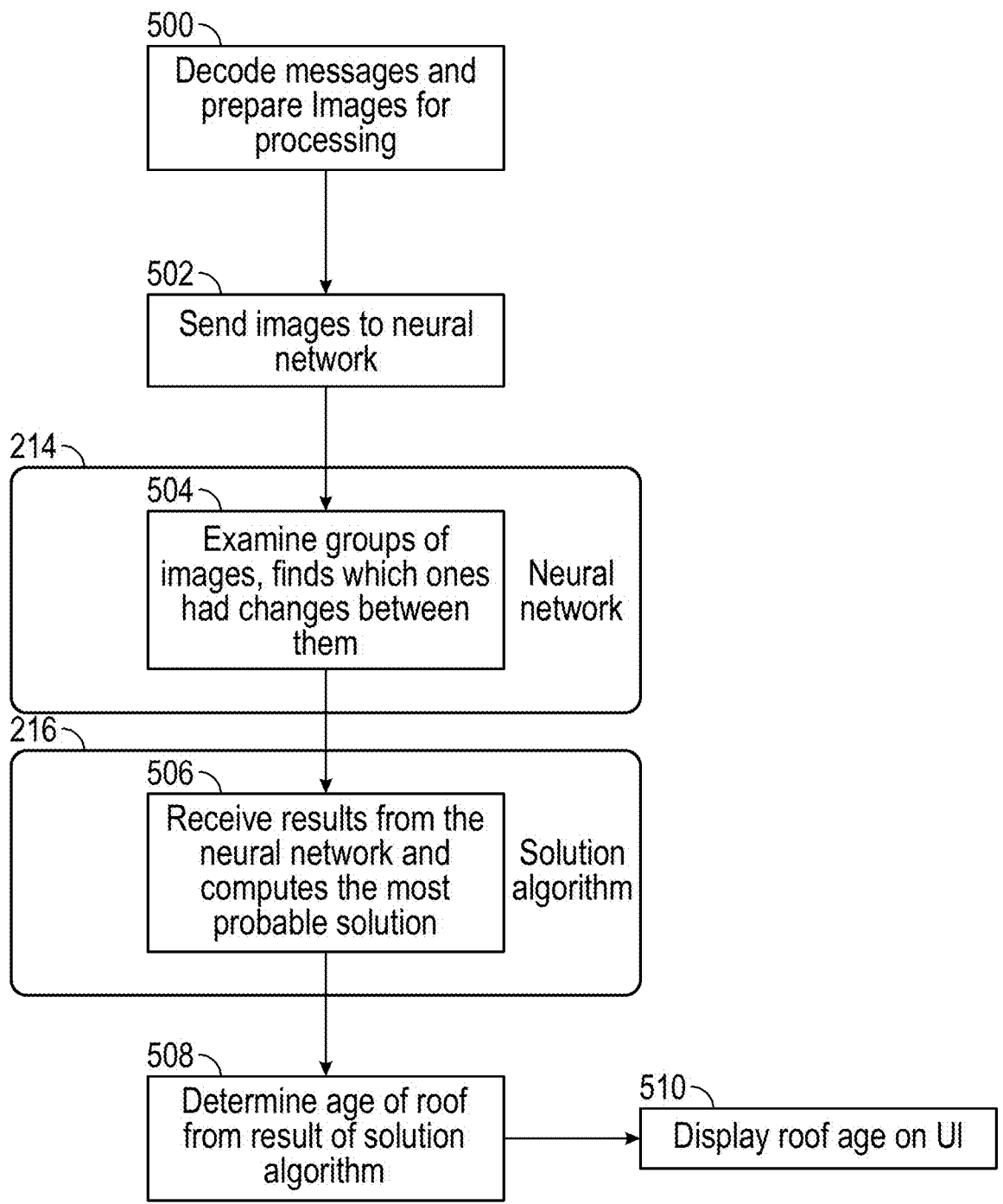
FIG. 5 is a flowchart of an exemplary method for preprocessing overhead images and determining an estimated roof age from the preprocessed overhead images using a neural network.

Referring now to FIG. 5, a flowchart of an exemplary method for preprocessing overhead images and determining an estimated roof age from the preprocessed overhead images using the neural network 214 is illustrated. In step 500 in this example, the roof analysis system 102 executing the roof age worker module 210 decodes the messages provided in step 412 of FIG. 4 and prepares the associated extracted overhead images for further analysis by performing any number of preprocessing techniques. For example, the overhead imagery, property boundaries, and/or building footprints may not all be aligned in the various overhead images. Thus, the roof analysis system 102 can align the overhead images based on one or more of a footprint of the building or a property boundary associated with the geographic location to preprocess the overhead images so that they are properly registered with each other.

In other examples, the preprocessing performed by the roof analysis system 102 can include cropping the overhead images to a dilated and expanded representation of the building footprint or the property boundary. Accordingly, the overhead images can be cropped to a dilated expansion of the building footprint, for example to focus on the area of interest and reduce computational complexity. The cropping can be performed by the roof analysis system 102 using a predefined template or by leveraging property boundary an/or building footprint data obtained from an external data provider 108, for example.

In yet other examples, the roof analysis system 102 can perform color space transformation(s), image enhancement(s) (e.g., edge detections, sharpening, and/or noise reduction), histogram equalization, or any other computer vision preprocessing technique. For example, the roof analysis system 102 can apply image enhancement technique(s) to improve the visibility of features and patterns in the overhead images. Such image enhancements can help the neural network 214 better identify changes in the roof's texture and material, for example, that may indicate a likely instance of change of the roof to inform the roof age estimation.

Additionally, the roof analysis system 102 can perform one or more normalizing, resizing, or resampling operations to preprocess the overhead images. For example, the roof analysis system 102 can normalize the overhead images to account for differences in lighting conditions, image sensor characteristics of capture devices, and/or other factors that may affect image quality. The normalization can be performed by the roof analysis system 102 by applying histogram equalization, adaptive histogram equalization, and/or other normalization technique(s) to ensure or improve consistency across the overhead images. Other types and/or another number of preprocessing techniques can also be applied by the roof analysis system 102 to one or more of the overhead images in other examples.

In step 502, the roof analysis system 102 executing the roof age worker module 210 provides the preprocessed images to the neural network 214. Optionally, the roof analysis system 102 can convert the preprocessed overhead images into one or more input data structures before providing the preprocessed overhead images to the neural network 214. The input data structures can be tensors or multi-dimensional arrays, for example, and prior to the conversion of the overhead images into the input data structures, the roof analysis system 102 can normalize pixel values of the overhead images to a consistent or predefined range (e.g., between 0 and 1), although other types of input data structure, normalization, and/or preprocessing techniques can also be used.

In step 504, the roof analysis system 102 applies the neural network 214 to the input data structures or preprocessed overhead images to thereby examine multiple or groups of the overhead images and identify which of the overhead images reflect changes between them that could represent a change in the roof to inform an estimate of roof age for the building. The neural network 214 in some examples is trained via overhead image sets and configured to extract relationships between features from the input data structures indicating one or more changes in a roof of the building and generate at least one output data structure representing the changes. The output data structure can include a matrix or tensor that represents the detected changes.

In step 506, the roof analysis system 102 applies the solution algorithm 216 to the output of the neural network 214 (e.g., the output data structure) to identify likely instances of change of the building roof from the changes according to the confidence algorithm 218. Thus, the solution algorithm is configured to analyze pattern(s) in the output data structure to determine likely instances of change of the roof. To determine the likely instances of change, the roof analysis system 102 can apply a statistical, heuristic and/or machine learning technique to the output data structure, for example, and other methods of determining the likely instances of change can also be used. Additionally, the solution algorithm 216 can be configured to determine whether the building has been removed or is obscured by overhanging trees or shadows, which may be a change identified by the solution algorithm but not a likely instance of change with respect to the building roof material or texture that might inform the roof age.

In some examples, the roof analysis system 102 applying the solution algorithm 216 considers various levels of change, such as full, partial, or section-by-section changes to the building roof. While the examples described and illustrated herein relate to changes in a building roof, the term roof as used herein includes an entirety of a roof or one or more portions or sections of a roof, and the likely instances of change therefore can correspond to partial or sectional roof changes, for example.

In step 508, the roof analysis system 102 generates the estimated roof age based on the most probable or likely one of the likely instances of change identified in step 506. The roof analysis system 102 can apply the confidence algorithm 218, for example, to the likely instances of change based on a likelihood of each of the likely instances of change or a time interval between one or more of the overhead images and a current time in order to generate the estimated roof age. For example, a likely instance of change indicating a change of a relatively high proportion of the roof or a relatively stark difference in sets of pixel value or portions of overhead images adjacent in time, for example, may indicate a higher likelihood with respect to the likely instance of change, weighing in favor of a particular likely instead of change being the most likely instance of change and reflecting a change in the roof that can be correlated with an age of the roof.

In another example, a relatively old likely instance of change with a large time interval, determined based on the temporal data (e.g., different historical points in time identified in the imagery data) associated with the overhead image(s) corresponding to the likely instance of change as compared to the current time, may weigh against the likely instance of change being the most likely instance of change indicative of a roof age. Other factors and types of analyses can also be performed in step 508 to identify one of the likely instances of change as a most likely instance of change. With the identified most likely instance of change, the roof analysis system 102 determines the estimated roof age based on a historical point in time identified and correlated in the imagery data with one of the overhead images corresponding to the most likely instance of change.

In step 510, the roof analysis system 102 generates a GUI that includes at least the estimated roof age generated in step 508, and optionally includes comparison or other visualizations. Thus, the roof analysis system 102 outputs an estimated roof age for the building roof via a user interface provided to the one of the user devices 106(1)-106(n) in response to the roof age request received as described with reference to step 400 of FIG. 4, for example.

In some examples, the GUI provided in step 510 includes a first one of the overhead images corresponding to the most likely instance of change along with a second one of the overhead images with a second associated historical point in time that is prior to the first historical point in time associated with the first one of the overhead images. The first and second ones of the overhead images thereby represent the roof before and after the most likely instance of change and allow a user to visually analyze the identified most likely instance of change. Optionally, the GUI output in step 510 can be configured to receive feedback data in response to the estimated roof age to indicate an accuracy of the estimated roof age, which can be used to continuously retrain the neural network 214

Figure 6:
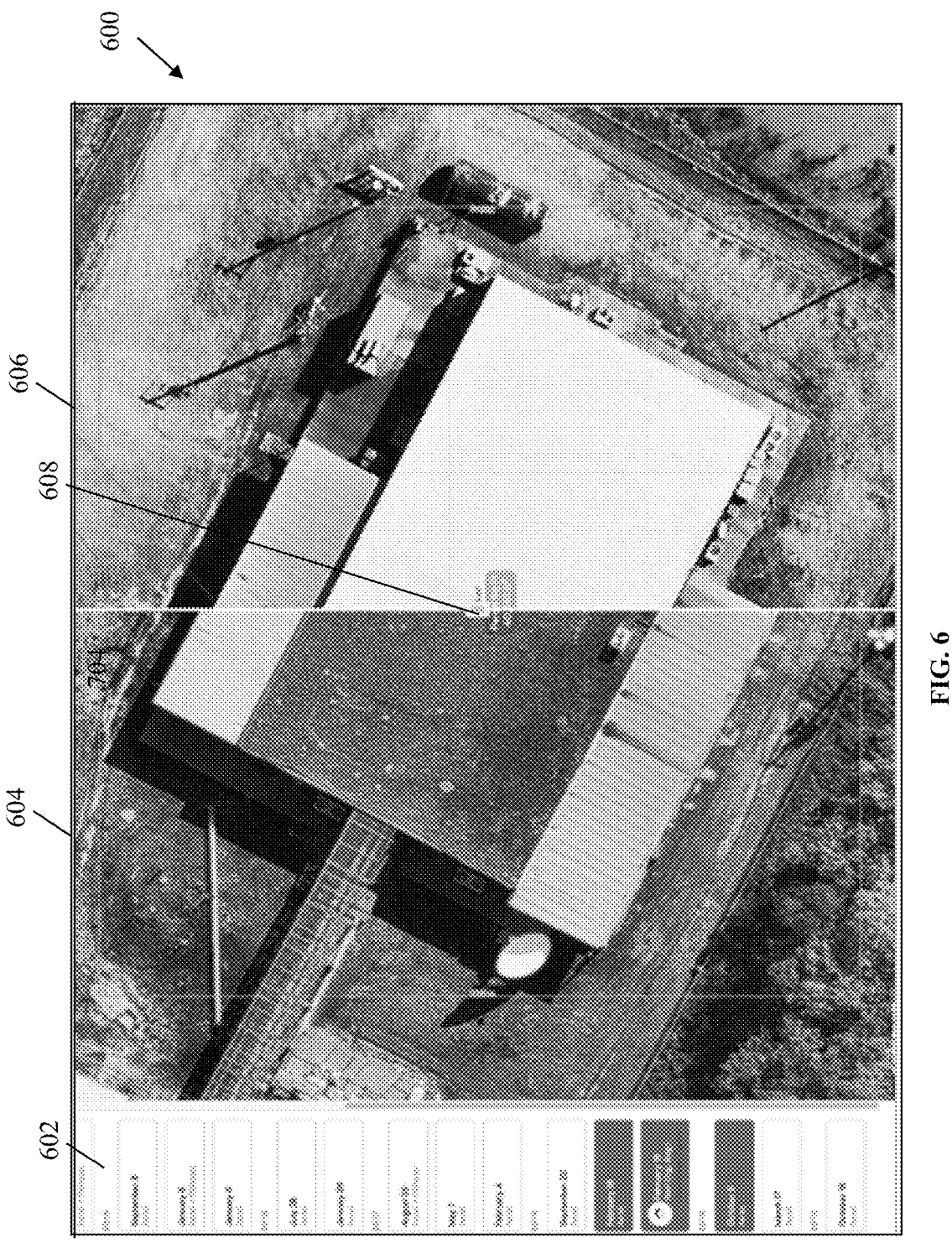
FIG. 6 is a screenshot of an exemplary GUI with a timeline and composite comparison images illustrating a likely instance of change in a building roof corresponding with the estimated roof age.

Referring to FIG. 6, a screenshot of an exemplary GUI 600 with a timeline 602 and composite comparison images 604 and 606 illustrating a most likely instance of change in a building roof corresponding with the estimated roof age is illustrated. The GUI 600 can be generated and output by the roof analysis system 102 in step 510 in some examples. The GUI 600 includes a first overhead image 604 and a second overhead image 606 in a composite configuration such that a user and use a slider 608 to make more or less of one of the first or second overhead images 604 and 606 visible in the GUI 600.

The second overhead image 604 in this example corresponds to the most likely instance of change and the first overhead image 604 corresponds with another historical point in time that is prior to the first historical point in time associated with the first overhead image 606. Thus, the overhead images 604 and 606 collectively represent the point in time at which the roof was changed (e.g., replaced). The roof analysis system 102 can determine the estimated roof age based on that point in time, as included in imagery data associated with the overhead images 604 and 606. The GUI 600 also includes a timeline 602 in this example with selectable buttons corresponding to a subset of the overhead images obtained for the property associated with the building. With the timeline 602, a user can interface with the GUI 600 to cause the GUI 600 to display any of the overhead images based on the associated historical point in time.

Figure 7:
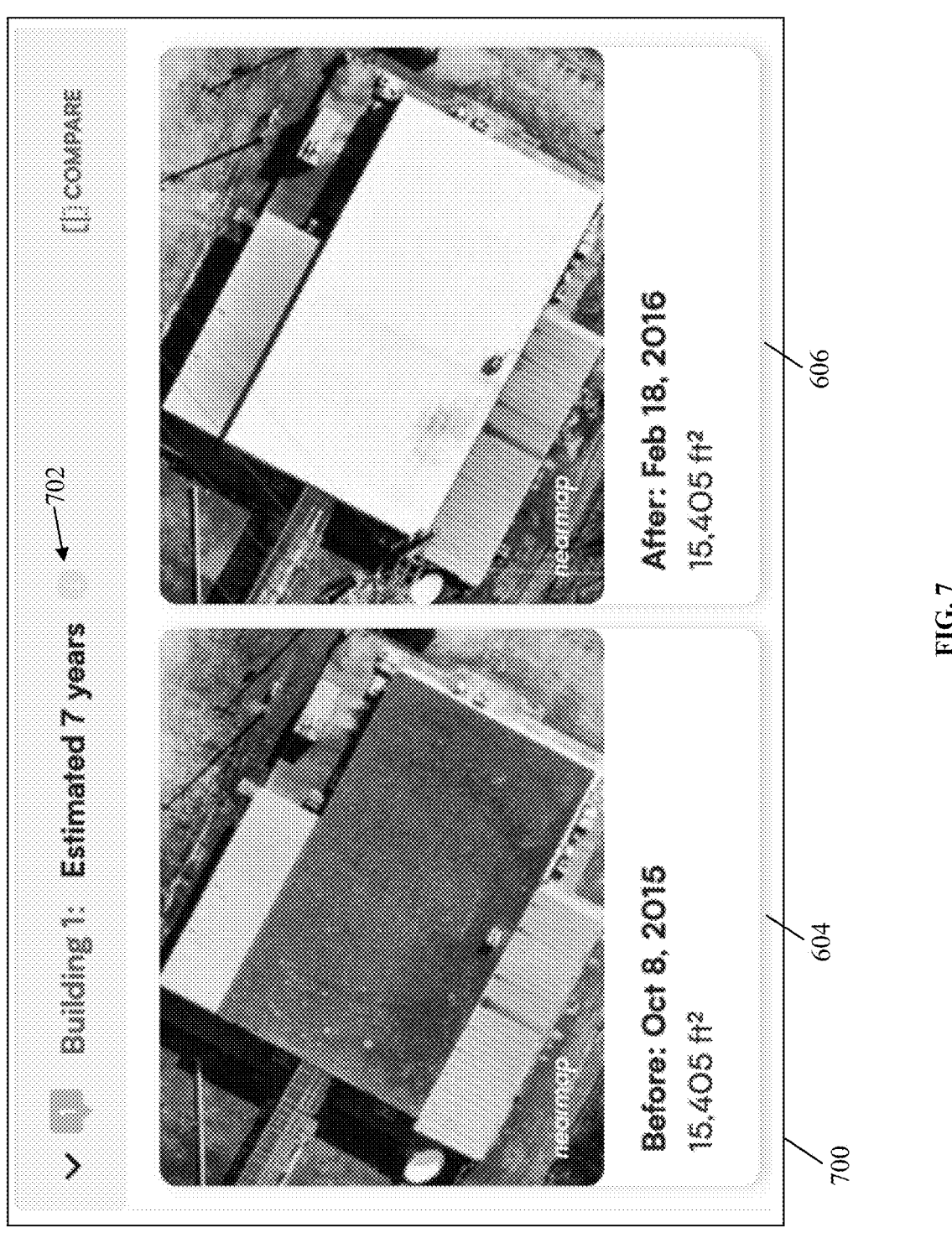
FIG. 7 is a screenshot of another exemplary GUI with side-by-side roof comparison visualizations and an estimated roof age.

Referring to FIG. 7, a screenshot of an exemplary GUI 700 with side-by-side roof comparison visualizations and an estimated roof age 702 is illustrated. In this example, the roof analysis system 102 generates the GUI 700 to include the full images of the first overhead image 604 and the second overhead image 606 in a side-by-side comparison configuration. In this example, the current year is 2023 and the second overhead image 606 has associated temporal data indicating a capture date of Feb. 18, 2016 and, therefore, the estimated roof age 702 is identified on the GUI 700 as seven years. Other types of GUIs, graphical displays, and/or visualizations can also be used in other examples.

Accordingly, as described and illustrated by way of the examples herein, this technology advantageously leverages advanced image preprocessing techniques and neural network-based analysis of overhead imagery to derive a more precise and objective estimation of roof age. The neural network-based analysis enables the roof analysis system 102 to identify patterns and relationships in overhead images that are not apparent via traditional methods, resulting in more accurate and reliable roof age estimations. Thus, this technology provides a non-invasive, cost-effective, and scalable means for assessing building roof age, which can be useful for property valuation, insurance assessments, maintenance planning, assessing the impact of a natural disaster, or monitoring the progress of roof repairs, for example. Additionally, the neural network 214 can be further trained and improved as more data becomes available, ensuring that the roof analysis system 102 remains up-to-date and accurate in its predictions.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure that are within known or customary practice in the art to which these teachings pertain.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

Aspects of the present technical solutions are described herein with reference to flowchart illustrations and/or block diagrams of methods, apparatuses (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As used herein, the terms "worker," "algorithm," "system," "module," "engine," or "architecture," if used herein, are not intended to be limiting of any particular implementation for accomplishing and/or performing the actions, steps, processes, etc., attributable to and/or performed thereby. An algorithm, system, module, engine, and/or architecture may be, but is not limited to, software, hardware and/or firmware or any combination thereof that performs the specified functions including, but not limited to, any use of a general and/or specialized processor in combination with appropriate software loaded or stored in a machine-readable memory and executed by the processor. Further, any name associated with a particular algorithm, system, module, and/or engine is, unless otherwise specified, for purposes of convenience of reference and not intended to be limiting to a specific implementation. Additionally, any functionality attributed to an algorithm, system, module, engine, and/or architecture may be equally performed by multiple algorithms, systems, modules, engines, and/or architectures incorporated into and/or combined with the functionality of another algorithm, system, module, engine, and/or architecture of the same or different type, or distributed across one or more algorithms, systems, modules, engines, and/or architectures of various configurations.

The flowchart and block diagrams in the figures illustrate the architecture, functionality, and operation of possible implementations of systems, methods, and computer program products according to various embodiments of the present technical solutions. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action can be said to be "in response to" a first action independent of whether the second action results directly or indirectly from the first action. The second action can occur at a substantially later time than the first action and still be in response to the first action. Similarly, the second action can be said to be in response to the first action even if intervening actions take place between the first action and the second action, and even if one or more of the intervening actions directly cause the second action to be performed. For example, a second action can be in response to a first action if the first action sets a flag and a third action later initiates the second action whenever the flag is set.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components. Similarly, a group having 1-5 components refers to groups having 1, 2, 3, 4, or 5 components, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method implemented by a roof analysis system and comprising:

preprocessing overhead images in imagery data obtained from an overhead imagery server based on a roof age request comprising a geographic location received from a user device, wherein each of the overhead images depicts a building at a different historical point in time identified in the imagery data;

applying a neural network to identify changes across the overhead images to a plurality of input data structures into which the overhead images are converted, wherein the neural network is trained to extract relationships between features from the input data structures indicating one or more changes in a roof of the building and generate at least one output data structure representing the changes;

analyzing one or more patterns in the output data structure to determine one or more likely instances of change of the roof;

selecting a most likely one of the likely instances of change by a confidence module that reflects the most recent change in the roof;

determining an estimated roof age based on a first historical point in time identified and correlated in the imagery data with a first one of the overhead images corresponding to one of the likely instances of change;

outputting the estimated roof age for the roof via a user interface provided to the user device in response to the roof age request, wherein the estimated roof age is generated based on the most likely one of the likely instances of change; and generating the user interface to include the first one of the overhead images and a second one of the overhead images identified and correlated in the imagery data with a second historical point in time that is prior to the first historical point in time to thereby represent the roof before and after the one of the likely instances of change, wherein the first one of the overhead images and the second one of the overhead images are in a composite configuration for use with a slider to make more or less of one of the first one of the overhead images and the second one of the overhead images visible in the user interface.

2. The method of claim 1, further comprising aligning the overhead images based on one or more of a footprint of the building or a property boundary associated with the geographic location to preprocess the overhead images.

3. The method of claim 1, further comprising cropping the overhead images to a dilated and expanded representation of the footprint or the property boundary to preprocess the overhead images.

4. The method of claim 1, further comprising normalizing, resizing, or resampling the overhead images to preprocess the overhead images.

5. The method of claim 1, further comprising enhancing the overhead images to preprocess the overhead images comprising applying a color space transformation.

6. The method of claim 1, wherein the input data structures comprise one or more tensors or one or more multi-dimensional arrays and the method further comprises normalizing pixel values of the overhead images within a range prior to converting the overhead images into the input data structures.

7. The method of claim 1, wherein the geographic location comprises an address or geographic coordinates, the building comprises a building entirety or a building section, and the likely instances of change correspond to an entirety of the roof or one or more portions or sections of the roof.

8. The method of claim 1, further comprising applying one or more of a statistical, heuristic, or machine learning technique to the output data structure to determine the likely instances of change of the roof.

9. The method of claim 1, further comprising receiving feedback data in response to the estimated roof age and retraining the neural network based on the feedback data.

10. The method of claim 1, wherein the time interval is determined based on the different historical points in time identified in the imagery data.

11. A roof analysis system, comprising memory having instructions stored thereon and one or more processors coupled to the memory and configured to execute the stored instructions to:

preprocess overhead images in imagery data obtained from an overhead imagery server based on a roof age request comprising a geographic location received from a user device, wherein each of the overhead images depicts a building at a different historical point in time identified in the imagery data;

apply a neural network to identify changes across the overhead images, wherein the neural network is trained to extract relationships between features from the overhead images indicating one or more changes in a roof of the building and generate at least one output data structure representing the changes;

analyze one or more patterns in the output data structure to determine one or more likely instances of change of the roof;

select a most likely one of the likely instances of change by a confidence module that reflects a most recent change in the roof;

determine an estimated roof age based on a first historical point in time identified and correlated in the imagery data with a first one of the overhead images corresponding to one of the likely instances of change;

output the estimated roof age for the roof via a user interface provided to the user device in response to the roof age request, wherein the estimated roof age is generated based on the most likely one of the likely instances of change; and generate the user interface to include the first one of the overhead images and a second one of the overhead images identified and correlated in the imagery data with a second historical point in time that is prior to the first historical point in time to thereby represent the roof before and after the one of the likely instances of change, wherein the first one of the overhead images and the second one of the overhead images are in a composite configuration for use with a slider to make more or less of one of the first one of the overhead images and the second one of the overhead images visible in the user interface.

12. The roof analysis system of claim 11, wherein the processors are further configured to execute the stored instructions to align the overhead images based on one or more of a footprint of the building or a property boundary associated with the geographic location to preprocess the overhead images.

13. The roof analysis system of claim 11, wherein the building comprises a building entirety or a building section, and the likely instances of change correspond to an entirety of the roof or one or more portions or sections of the roof.

14. The roof analysis system of claim 11, wherein the processors are further configured to execute the stored instructions to: normalize pixel values of the overhead images within a range; convert the overhead images into one or more input data structures; and apply the neural network to the input data structures, wherein the input data structures comprise one or more tensors or one or more multi-dimensional arrays.

15. A non-transitory computer readable medium having stored thereon instructions comprising executable code that, when executed by one or more processors, causes the processors to:

preprocess overhead images in imagery data obtained from an overhead imagery server based on a roof age request comprising a geographic location received from a user device, wherein each of the overhead images depicts a building at a different historical point in time;

apply a neural network to identify changes across the overhead images, wherein the neural network is trained to extract relationships between features from the overhead images indicating one or more changes in a roof of the building and generate at least one output representing the changes;

analyze one or more patterns in the output to determine one or more likely instances of change of the roof;

select a most likely one of the likely instances of change by a confidence module that reflects a most recent change in the roof;

determine an estimated roof age based on a first historical point in time identified and correlated in the imagery data with a first one of the overhead images corresponding to one of the likely instances of change;

output the estimated roof age for the roof via a user interface provided to the user device in response to the roof age request, wherein the estimated roof age is generated based on the most likely one of the likely instances of change; and generate the user interface to include the first one of the overhead images and a second one of the overhead images identified and correlated in the imagery data with a second historical point in time that is prior to the first historical point in time to thereby represent the roof before and after the one of the likely instances of change, wherein the first one of the overhead images and the second one of the overhead images are in a composite configuration for use with a slider to make more or less of one of the first one of the overhead images and the second one of the overhead images visible in the user interface.

16. The non-transitory computer readable medium of claim 15, wherein the executable code, when executed by the processors, further causes the processors to: convert the overhead images into one or more input data structures; and apply the neural network to the input data structures, wherein the input data structures comprise one or more tensors or one or more multi-dimensional arrays.

* * * * *